United States Patent
Duverdier et al.

(10) Patent No.: US 8,001,169 B2
(45) Date of Patent: Aug. 16, 2011

(54) SPREAD SPECTRUM METHOD WITH ELIMINATION OF SUB-BANDS

(75) Inventors: Alban Duverdier, Toulouse (FR); Wilfried Chauvet, Toulouse (FR)

(73) Assignee: Centre National d'Etudes Spatiales, Paris Cedex (FR)

( * ) Notice: Subject to any disclaimer, the term of this patent is extended or adjusted under 35 U.S.C. 154(b) by 831 days.

(21) Appl. No.: 11/658,413

(22) PCT Filed: Jul. 20, 2005

(86) PCT No.: PCT/FR2005/001870
§ 371 (c)(1),
(2), (4) Date: Mar. 7, 2008

(87) PCT Pub. No.: WO2006/018505
PCT Pub. Date: Feb. 23, 2006

(65) Prior Publication Data
US 2008/0304548 A1    Dec. 11, 2008

(30) Foreign Application Priority Data

Jul. 27, 2004 (FR) ..................................... 04 08296

(51) Int. Cl.
*G06F 17/10* (2006.01)
(52) U.S. Cl. ........................................................ 708/300
(58) Field of Classification Search ........................ None
See application file for complete search history.

(56) References Cited

U.S. PATENT DOCUMENTS

| | | | |
|---|---|---|---|
| 7,430,257 B1* | 9/2008 | Shattil | 375/347 |
| 7,593,449 B2* | 9/2009 | Shattil | 375/130 |
| 2002/0196839 A1* | 12/2002 | Hunton | 375/130 |
| 2004/0264977 A1* | 12/2004 | Yap et al. | 398/161 |
| 2007/0211786 A1* | 9/2007 | Shattil | 375/141 |
| 2009/0110033 A1* | 4/2009 | Shattil | 375/141 |

OTHER PUBLICATIONS

R. Ishii and M. Kakishita, A Design Method for a Periodically Time-Varying Digital Filter for Spectrum Scrambling, IEEE Transactions on Acoustic and Signal Processing, Jul. 1990, pp. 1219-1222, vol. 38, No. 7.

W. Chauvet et al., Design of Orthogonal LPTV filters: Application to spread spectrum multiple access, IEEE, May 17, 2004, pp. 645-648, vol. 2.

W. Chauvet et al., Characterization of a set of invertible LPTV filters using circulant matrices, IEEE, Apr. 6, 2003, pp. VI45-VI-48, vol. 1.

* cited by examiner

*Primary Examiner* — David H Malzahn
(74) *Attorney, Agent, or Firm* — Bachman & LaPointe, P.C.

(57) ABSTRACT

A spread spectrum method for a digital input signal ($x(n)$), comprising the following steps: coefficients of a reversible digital periodical linear filter are selected in such a way that the spectrum of the input signal ($x(n)$) is spread in order to occupy a spread frequency band (B) with the exception of at least one eliminated frequency sub-band (B'), included in a spread frequency band, and the input signal is processed via the digital periodical linear filter in such a way as to obtain a spread spectrum output signal ($y(n)$).

11 Claims, 7 Drawing Sheets

SPREAD SPECTRUM METHOD WITH ELIMINATION OF SUB-BANDS

BACKGROUND

(1) Field of the Invention

This invention relates to a spread spectrum method and device.

It applies in particular, but not exclusively, to satellite transmissions and to mobile telecommunications using spread spectrum techniques.

(2) Prior Art

During transmissions jammed by limited frequency band interferers, the receivers generally put strategies into place for detecting and eliminating the jammers. It is also possible to use a spectral spread technique, which limits the influences of the jammer. Nevertheless, no single method exists for producing a spectral spread excluding certain predefined frequency bands.

Furthermore, it has already been proposed to use Linear Periodically Time-Varying (LPTV) filters in order to generalize conventional Direct Sequence—Code Division Multiple Access (DS-CDMA) transmission techniques, wherein the pseudo-random sequence is replaced by a filter of this type used, for example, as an interleaver.

SUMMARY OF THE INVENTION

The purpose of this invention is to propose a spread spectrum method excluding certain predefined frequency bands. This objective is achieved by anticipating a spread spectrum method for a digital input signal.

According to the invention, this method includes steps consisting of:
  choosing coefficients for an invertible digital linear periodic filter such that it spreads the spectrum of the input signal in order to occupy a spread frequency band, with the exception of at least one eliminated frequency sub-band included in the spread frequency band, and
  processing the input signal with the digital linear periodic filter so as to obtain a spread-spectrum output signal.

The output of the periodic linear filter is preferably capable of preserving the input signal envelope.

According to one preferred embodiment of the invention, the digital linear periodic filter has a z-transform in a frequency representation having the following form:

$$Y(z) = \sum_{p=0}^{N-1} T_p \cdot X(zW^p)$$

wherein:

$$T_p = \frac{1}{N} \sum_{k=0}^{N-1} W^{g(k)+pk},$$

$$W = \exp\left(-\frac{2i\pi}{N}\right),$$

N is the filter period, and g(k), for the integers k falling between 0 and N−1 are coefficients to be determined.

The choice of the coefficients g(k) preferably includes steps consisting in canceling the terms $T_p$ of the filter for all the values of p, such that:

$$\left[-E\left(\frac{f_{max}-b_{min}}{B}N\right)\right]_N \leq p \leq \left[-E\left(\frac{f_{min}-b_{max}}{B}N\right)-1\right]_N,$$

an expression in which [fmin, fmax] represents the frequency band of the digital input signal, B represents the spread frequency band, [bmin, bmax] represents the eliminated frequency sub-band included in the frequency band B, E(a) represents the integer part function and $[a]_N$ represents the "modulo N" function.

The canceling of a term $T_p$ of the linear periodic filter advantageously consists in regrouping all the integers falling between 0 and N−1 in pairs $(k_0, k_1)$ such that:

$$W^{g(k_0)+pk_0} + W^{g(k_1)+pk_1} = 0$$

According to one preferred embodiment of the invention, the linear periodic filter is applicable to a constant envelope input signal.

According to another preferred embodiment of the invention, the input signal is pre-oversampled.

Prior to being oversampled, the input signal is preferably processed by a digital modulator having an M-point constellation.

According to a preferred embodiment of the invention, the output signal of the linear periodic filter is oversampled.

According to a preferred embodiment of the invention, the oversampled output signal is processed by a root raised cosine low-pass filter.

According to a preferred embodiment of the invention, the periodic linear filter has a period of the form 2n, n being a positive integer.

BRIEF DESCRIPTION OF THE DRAWINGS

One preferred embodiment of the invention will be described below, for non-limiting illustrative purposes, with reference to the appended drawings in which.

DETAILED DESCRIPTION OF THE PREFERRED EMBODIMENTS)

Figure 1:
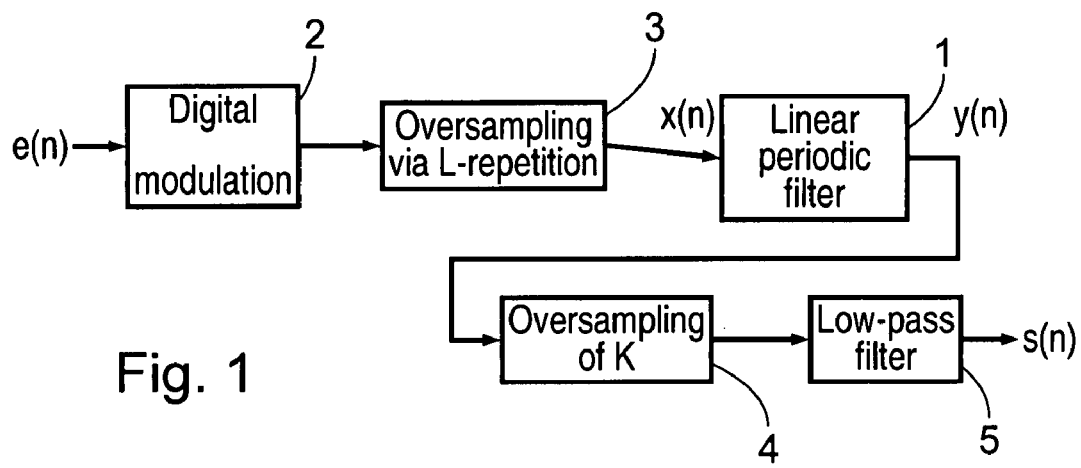
FIG. 1 shows an example of a digital transmission link implementing the spread spectrum method according to the invention.

FIG. 1 shows a link for transmitting digital signals e(n) via spread spectrum. First and foremost, this link includes a digital modulator 2, which carries out a labeling operation on the input signals e(n) in the form of bit streams. The output signal of the digital modulator 2 is applied to the input of the first oversampler 3, which oversamples the modulated signal e(n) by repeating each sample of this signal L times. The oversampled signal x(n) at the output of the oversampler 3 is applied to the input of a digital linear periodic filter 1 according to the invention. The samples y(n) obtained at the output of the filter 1 are then processed by a second oversampler 4, which multiplies the number of samples of the signal that it is processing by a factor K, e.g., by inserting K zero samples between each sample of the signal applied at the input. The output signal of the second oversampler 4 is finally processed by a digital low-pass filter 5 ensuring spectral shaping of the signal and delivering a transmission link output signal s(n).

The digital modulator, for example, is an M-point constellation, phase-shift (MDP-M, M-PSK, M-MSK) and/or amplitude-shift H(MAQ-M) modulator.

Figure 2:
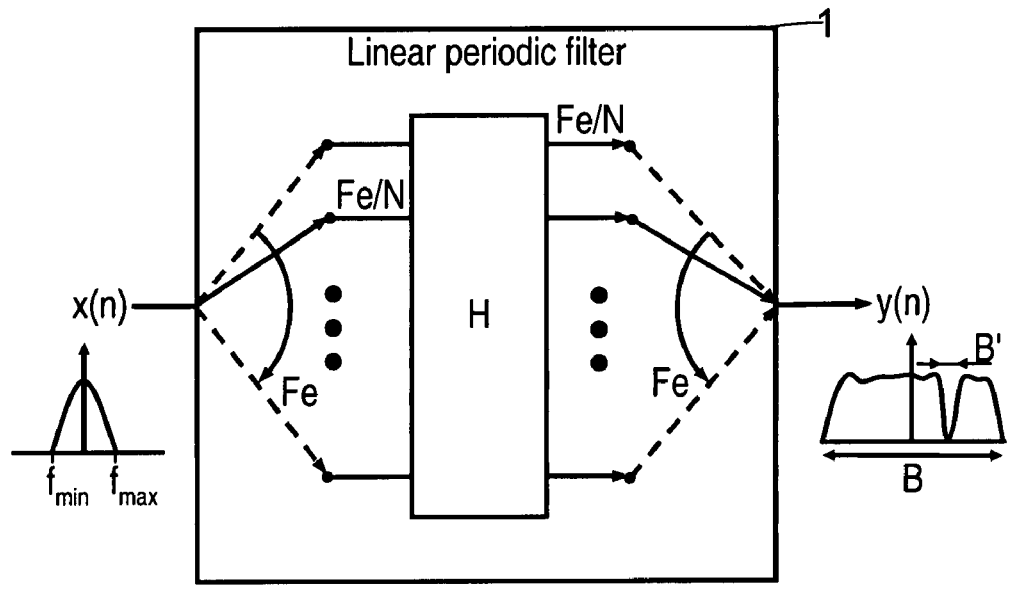
FIG. 2 shows the linear periodic filter appearing in the transmission link shown in FIG. 1, in greater detail.

According to the invention, the filter 1 is chosen so as to obtain an output signal whose spectrum is spread with sub-bands eliminated. This filter is a linear periodically time-varying (LPTV) filter shown schematically in FIG. 2, in the form of a switched input and output representation (MIMO: Multiple Input Multiple Output). In a polyphase representation, the filter 1 comprises a z-transfer matrix function $\overline{H}(z)=[H_{i,j}(z)]$, comprising N channels (N inputs and N outputs), and an input channel selector synchronous with an output channel selector. The input and output channel selectors are operated at a rate equal to Fe, Fe being the sampling frequency for the input signal x(n), and N being the filter period. The frequency of the signal in the input and output channels is therefore equal to Fe/N.

This filter transforms the input signal x(n) contained in the frequency band [$f_{min}/f_{max}$} into an output signal y(n) occupying a frequency band B with at least one sub-band B' eliminated.

This filter has a time-varying impulse response with a periodicity N, and can be represented by the following relationship:

$$y(n) = \sum_{k=-\infty}^{+\infty} h(n,k) \cdot x(n-k) \qquad (1)$$

h(n,k) being the impulse response of the filter at the moment n. Since the filter has a period equal to N, h verifies the following equality:

$$h(n+N,k)=h(n,k) \qquad (2)$$

In the N-component polyphase representation of the input x(n) and output y(n) signals of the filter 1, the signals x(n) and y(n) can be broken down in the following way:

$$x(n)=[x_0(n),\ldots,x_{N-1}(n)] \text{ et } y(n)=[y_0(n),\ldots,y_{N-1}(n)] \qquad (1)$$

with $x_k(n)=x(nN+k)$ and $y_k(n)=y(nN+k)$, k ranging between 0 and N−1. The z-transform of the component $x_k(n)$ can be obtained from the following formula:

$$X_k(z) = \sum_{n=-\infty}^{+\infty} x_k(n) z^{-n} \qquad (4)$$

It is easily shown that the z-transform $Y_k(Z)$ of the polyphase component k of the signal y(n) is written as a function of the z-transform of the signal x(n) in the following way:

$$Y_k(z) = \sum_{j=0}^{N-1} X_j(z) \cdot H_{k,j}(z) \qquad (5)$$

with:

$$\overline{X}(z) = [\,X_0(z)\ X_1(z)\ \ldots\ X_{N-1}(z)\,] \qquad (2)$$

$$\overline{Y}(z) = [\,Y_0(z)\ Y_1(z)\ \ldots\ Y_{N-1}(z)\,], \qquad (3)$$

$$\overline{H}(z) = \begin{bmatrix} H_{0,0}(z) & H_{0,1}(z) & \ldots & H_{0,N-1}(z) \\ H_{1,0}(z) & H_{1,1}(z) & \ldots & H_{1,N-1}(z) \\ \vdots & \vdots & \ddots & \vdots \\ H_{N-1,0}(z) & H_{N-1,1} & \ldots & H_{N-1,N-1}(z) \end{bmatrix} \qquad (8)$$

and $$\overline{Y}(z) = \overline{H}(z) \cdot \overline{X}(z) \qquad (9)$$

A filter such as this can likewise be represented in frequency form as a z-transform, in the following way:

$$Y(z) = \sum_{p=0}^{N-1} T_p(zW^p) \cdot X(zW^p) \qquad (10)$$

in which W is the Nth root of unity: $W=\exp(-2i\pi/N)$, and the terms $T_p(z)$ represent modulating filters such that:

$$T_p(z) = \frac{1}{N} \sum_{j=0}^{N-1} z^{-j} \sum_{k=0}^{N-1} H_{j,k}(z^N) \cdot z^k \cdot W^{pj} \qquad (11)$$

Figure 3:
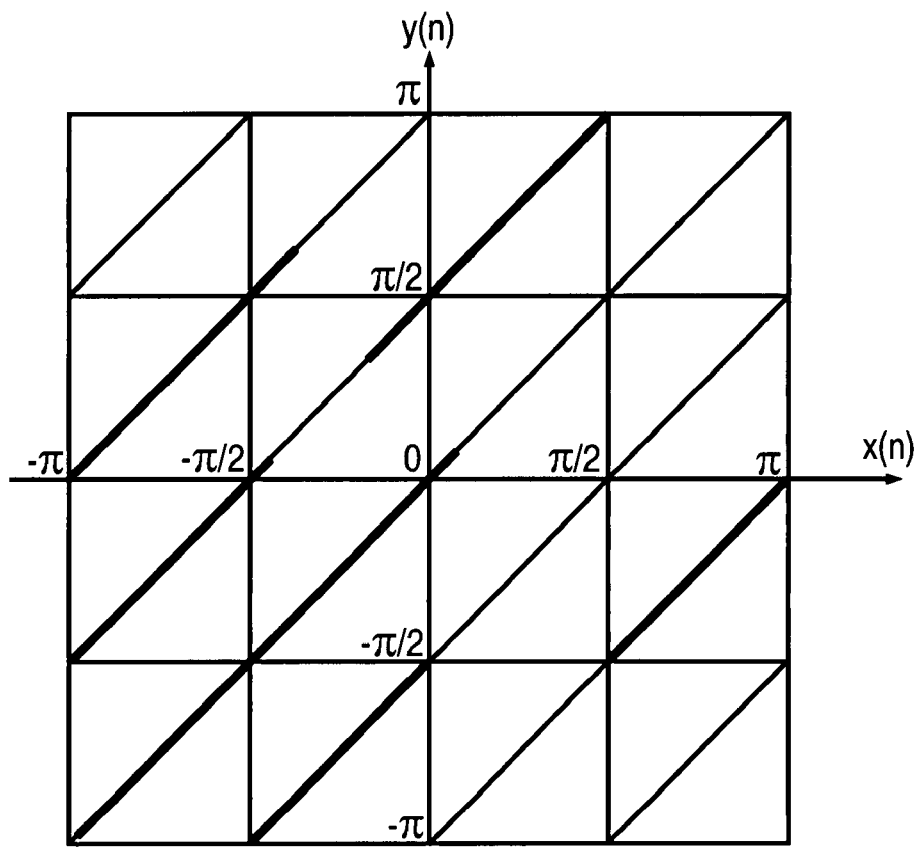
FIG. 3 is a dual-frequency representation of an exemplary filter of the type shown in FIG. 2.

FIG. 3 is a dual frequency representation of an exemplary linear periodic filter of period N=4, which makes it possible to express the spectrum of the input signal x(n). The thick lines in this figure show the areas or frequency responses of the modulating filters $T_p(z)$ that are non-null (higher than a give threshold).

In order to determine the signal x(n) at the receiving end, on the basis of the signal y(n), the filter 1 must be invertible. Furthermore, in applications using satellite transmission, the signals are amplified in a non-linear manner. In this type of application, the signal after spreading must have a complex constant envelope.

These conditions are met if a phase-shift modulator is chosen and a digital linear periodic filter having in its polyphase representation a matrix of which only the components $H_{k,k}(z)=H_k(z)$ are non-null, and chosen so as to equal $W^{g(k)}$, g(k) (k varying from 0 to N−1) being real coefficients. It follows that:

$$T_p(z) = T_p = \frac{1}{N} \sum_{k=0}^{N-1} W^{g(k)+pk} \qquad (12)$$

Figure 4:
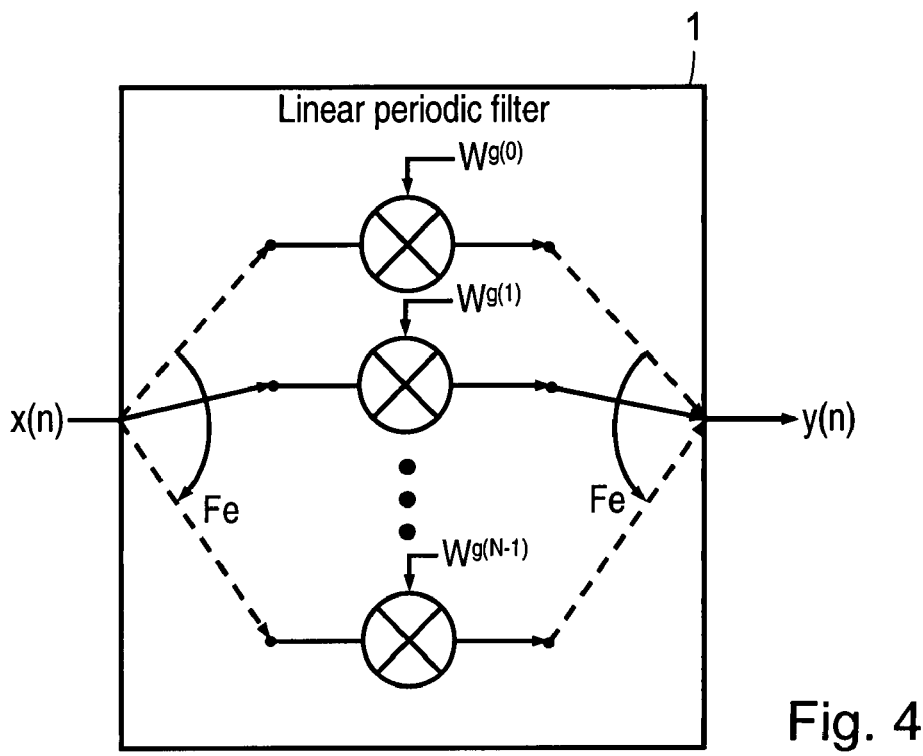
FIG. 4 shows an embodiment of the filter shown in FIG. 2, in greater detail.

A filter such as this is shown in FIG. 4.

The inverse filter that can be used at the receiver end $H'_k(Z)$ giving x(n) as a function of y(n) for the component k then has the form:

$$H'_k(Z)=W^{-g(k)} \qquad (13)$$

Furthermore, the original signal X(z), in z-transform notation, can be obtained from the signal received Y(z), by the following relationship:

$$X(z) = \sum_{p=0}^{N-1} T'_p(zW^p) \cdot Y(zW^p) \qquad (14)$$

It follows that:

$$T'_p(z) = T'_p = \frac{1}{N} \sum_{k=0}^{N-1} W^{-g(k)+pk} \quad (15)$$

According to the invention, it is possible to determine the parameters $g(k)$ of the filter so as to obtain at least one eliminated sub-band B'.

Such being the case, in order to cancel a band signal $[f_{min}, f_{max}]$ in the frequency sub-band $B'=[b_{min}, b_{max}]$, it is demonstrated that the terms $T_p$ for all the values of p contained in the modulo N-defined segment $[p_{min}, p_{max}]$ must be canceled, such that:

$$p_{min} = \left[-E\left(\frac{f_{max} - b_{min}}{B}N\right)\right]_N \quad (4)$$

$$p_{max} = \left[-E\left(\frac{f_{min} - b_{max}}{B}N\right) - 1\right]_N \quad (5)$$

In these formulas, the expression "[a]N" signifies "a modulo N," i.e., represents the remainder of the integer division of a by N, and "E(a)" represents the integer part of a.

Conversely, when the frequency band B' is occupied by a jamming signal, it is a matter of preventing the signal recovered by the LTPV filter, which is the inverse of filter 1, from containing residual jamming in the band $[f_{min}, f_{max}]$. It turns out that this condition is verified if the inverse modulating filters $T'_p$ are null for all the values of p contained in the interval $[p'_{min}, p'_{max}]$. It is demonstrated that:

$$p'_{min} = \left[E\left(\frac{f_{min} - b_{max}}{B}N\right) + 1\right]_N \quad (18)$$

$$p'_{max} = \left[E\left(\frac{f_{max} - b_{min}}{B}N\right)\right]_N \quad (19)$$

When the digital linear periodic filter chosen is used directly for re-labeling the complex chip symbols at a rate $R_C$, the frequency band $[f_{min}, f_{max}]$ equal to $[-R_C/2, R_C/2]$ and the band B equal to Fe are chosen.

In order to cancel the terms $T_p$ of the filter 1 for a value $p_1$ of p (integer), it is proposed that the quantities $W^{g(k)+p_1k}$ be canceled in pairs. This operation consists in regrouping the elements of the entire set $E_N$ of integers falling between 0 and N−1 in pairs $(k_0, k_1)$ such that:

$$W^{g(k_0)+p_1k_0} + W^{g(k_1)+p_1k_1} = 0 \quad (6)$$

which makes it possible to obtain N/2 conditions involving the N coefficients $g(k)$ of the filter:

$$g(k_0(j)) - g(k_1(j)) = \left[p_1(k_1(j) - k_0(j)) + \frac{N}{2}\right]_N \quad (21)$$

for all the values of j falling between 0 and $$\frac{N}{2} - 1.$$

The values of $g(k)$ are thus linked in pairs by N/2 linear equations.

The following algorithm is applicable to the particular case where the filter period N is chosen to have the form $N=2^n$, n being an integer.

In order to find a first set of paired elements $(k_0, k_1)$ of the entire set $E_N$ of integers falling between 0 and N−1, an integer $a_1$ is chosen, ranging between 0 and n−1, such that $k_1(j)=k_0(j)+2^{a_1}$ for all the values of j falling between 0 and $$\frac{N}{2} - 1 = 2^{n-1} - 1 \cdot 2^{a_1}$$

thus represents the "distance" between the elements $k_0$, $k_1$ forming the pairs $(k_0, k_1)$.

It turns out that the fact of canceling a term $T_p$ for a certain value of p brings about the cancellation of other terms $T_p$. As a matter of fact, if the terms $T_p$ are null for two values $p_a$ and $p_b$, the following relationship occurs:

$$\left[p_a(k_1(j) - k_0(j)) + \frac{N}{2}\right]_N = \left[p_b(k_1(j) - k_0(j)) + \frac{N}{2}\right]_N \quad (22)$$

for all the values of j falling between 0 and $$\frac{N}{2} - 1.$$

If $k_1(j)=k_0(j)+2^{a_1}$, it follows from equation (22) that:

$$[(p_b - p_a)2^{a_1}]_N = 0, \text{ given } p_b = [p_a]_{2^{n-a_i}} \text{ if } N=2^n. \quad (7)$$

Consequently, if a term $T_p$ of the filter is canceled for a value of p, the terms $T_{p'}$ of the filter for all the values $p'=[p+j\cdot 2^{n-a_1}]_N$, which reduces the spread quality if the elimination of the sub-bands thereby eliminated is undesirable.

If, for example, the term $T_0$ is canceled, all the terms $T_{[j2^{n-a_1}]_N}$ are also cancelled. If $a_1=n-1$ is chosen, all the terms $T_{2p}$ are also cancelled.

In order to eliminate a frequency band $B'=[b_{min}, b_{max}]$, it is necessary for all the terms $T_p$ of the filter to be cancelled for all the consecutive values of p situated in the interval $[p_{min}, p_{max}]$. Thus, it is a matter of finding new pairs of elements of the set $E_N$ that must all be different from the preceding ones in order to keep the cancellation of $T_{p_1}$.

To this end, the pairs used in the preceding iteration in quadruplets are regrouped in pairs, by choosing a new value $a_2$, which is different from $a_1$, such that the "distance" between the regrouped pairs is equal to $2^{a_2}$, i.e., the pairs $(k_0, k_1)$ and $(k'_0, k'_1)$ are regrouped in quadruplets such that:

$$k'_0 = k_0 + 2^{a_2}. \quad (8)$$

This condition makes it possible to obtain, in quadruplet $(k_0, k_1, k'_0, k'_1)$, two new equations of form (21), which are in fact equivalent:

$$g(k'_0(j)) - g(k_0(j)) = \left[p_0(k'_0(j) - k_0(j)) + \frac{N}{2}\right]_N \quad (9)$$

$$g(k'_1(j)) - g(k_1(j)) = \left[p_0(k'_1(j) - k_1(j)) + \frac{N}{2}\right]_N \quad (10)$$

namely a single quadruplet equation, i.e., $$\frac{N}{4} = 2^{n-2}$$

linear equations with N unknowns.

At the next iteration, the quadruplets (groups of 4 integers) are regrouped in groups of 8 integers per pair, such that the first element of the second group is distant by $2^{a_3}$ from the first element of the first group, each group thus obtained supplies an additional equation on the coefficients g(k) being determined.

This iteration can be repeated as many times as necessary, within a certain limit, in order to completely eliminate a band B' of the desired width, while taking care, at each iteration j, to choose all different values $a_j$ of distance between the regrouped groups, such that $k'_0 = k_0 + 2^{a_j}$. It is demonstrated that the maximum band width capable of being eliminated corresponds to a maximum number of consecutive zero filters equal to 4(n−3)+3.

Of course, other forms of values for the filter period N can be chosen. In this way, if N is chosen for the form $2^n+4$, it can be observed that the spread produced by the filter is of improved quality (fewer undesirable cancellations of terms $T_p$).

FIGS. 5 to 13 show the performance levels of the device shown in FIG. 1, in the form of spectral curves of the signals x(n) and y(n) as a function of the normalized frequency (f/Fe on the abscissa), in the case where the digital input modulator 2 has a two-point constellation (M=2), the oversampler 4 has a factor K equal to 4, and the output filter 5 is a root raised cosine filter.

Figure 5:
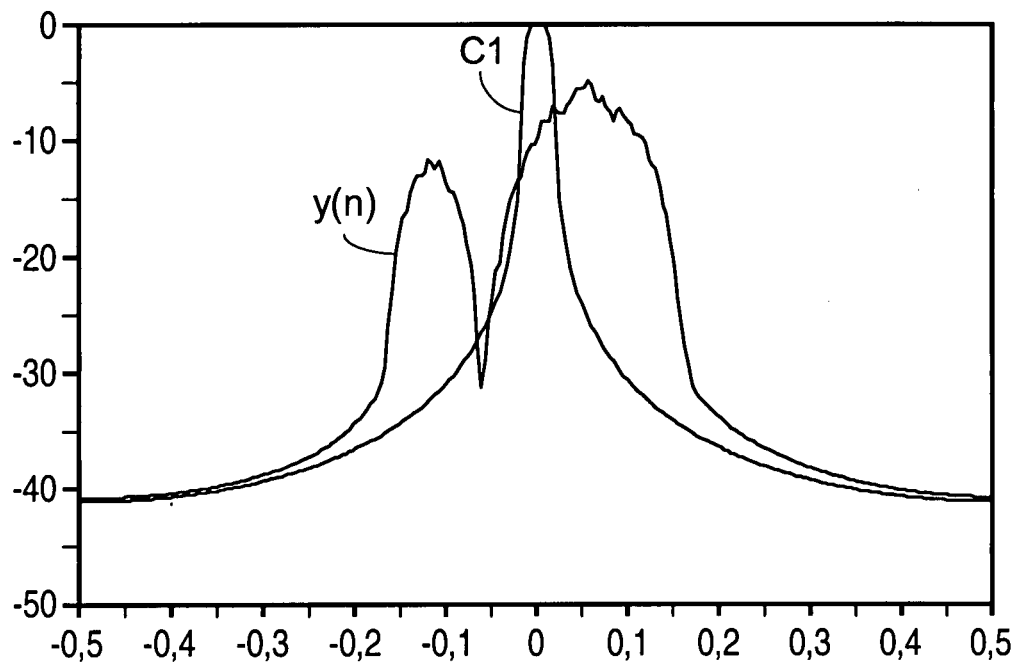
FIGS. 5 to 13 show examples of spectra capable of being obtained by means of the filter shown in FIG. 4.
Figure 6:
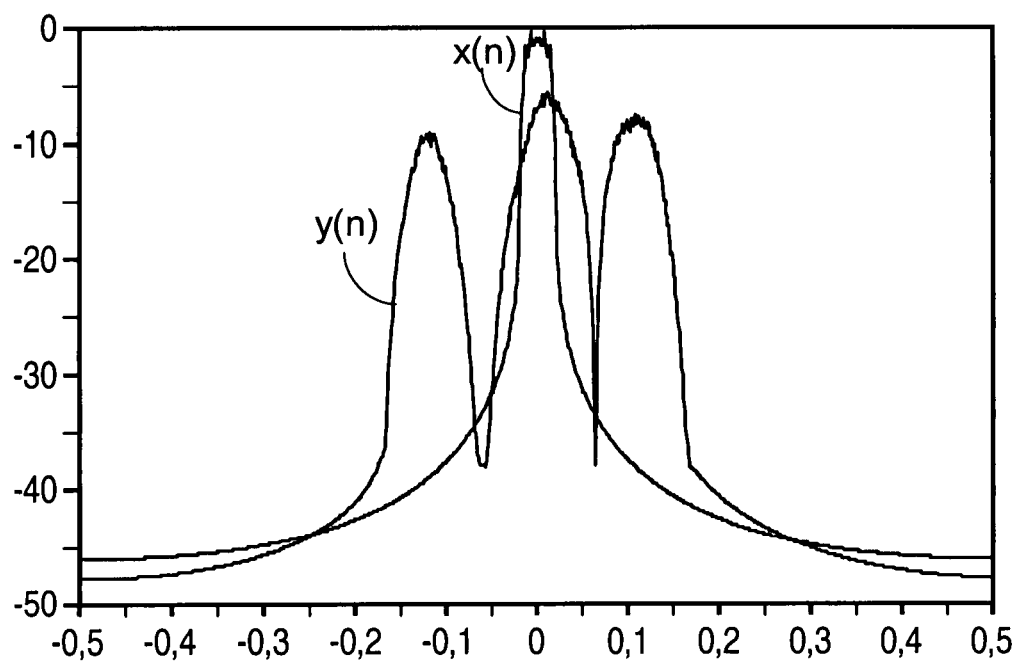
Figure 7:
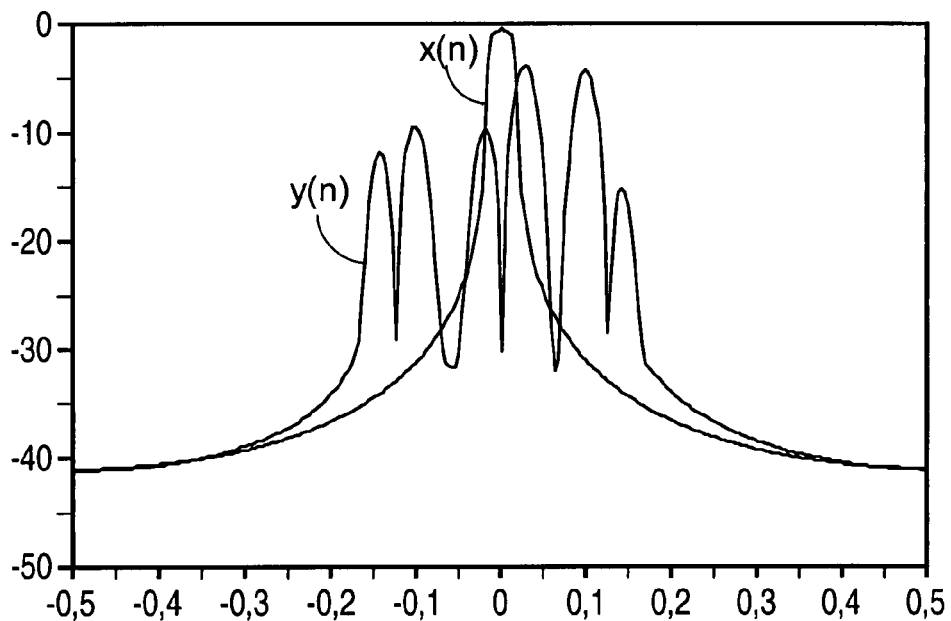

The spectra of the signals y(n) in FIGS. 5 to 10 are obtained with a linear periodic filter 1 having a period N equal to $2^{10}$. The spectra of FIGS. 5 to 7 are obtained with a slight spread (the oversampler 3 has a spreading factor L equal to 8). In these figures, the spectral curves of the output signal y(n) are obtained when the terms $T_p$ of the filter 1 are cancelled in the vicinity of the normalized frequency −0.07, for three, four and nine consecutive values of p, respectively, which corresponds to a degree of freedom D for the choice of the coefficients g(i) of the filter 1, equal to $2^7$, $2^6$ and 2, respectively.

Figure 8:
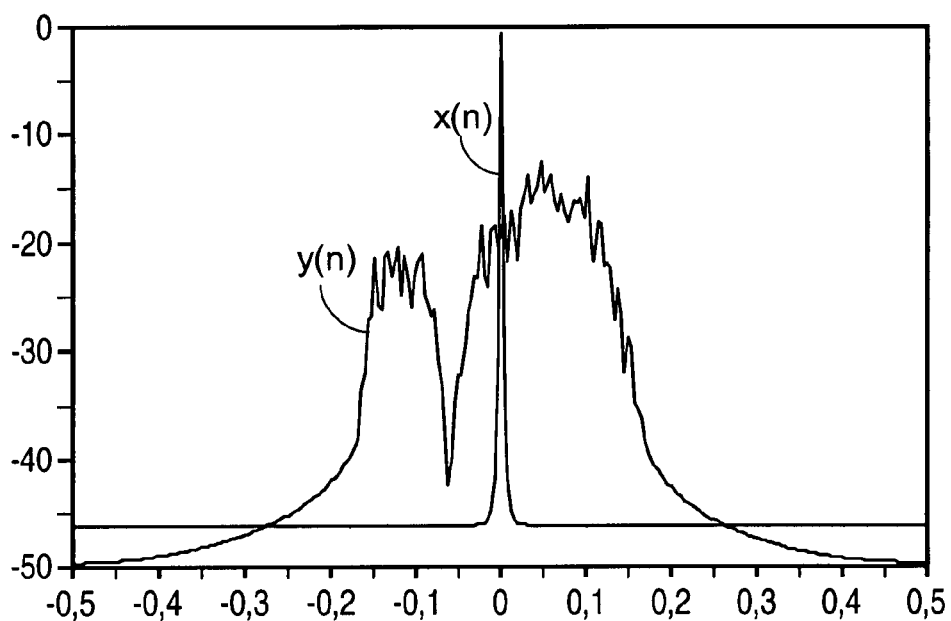
Figure 9:
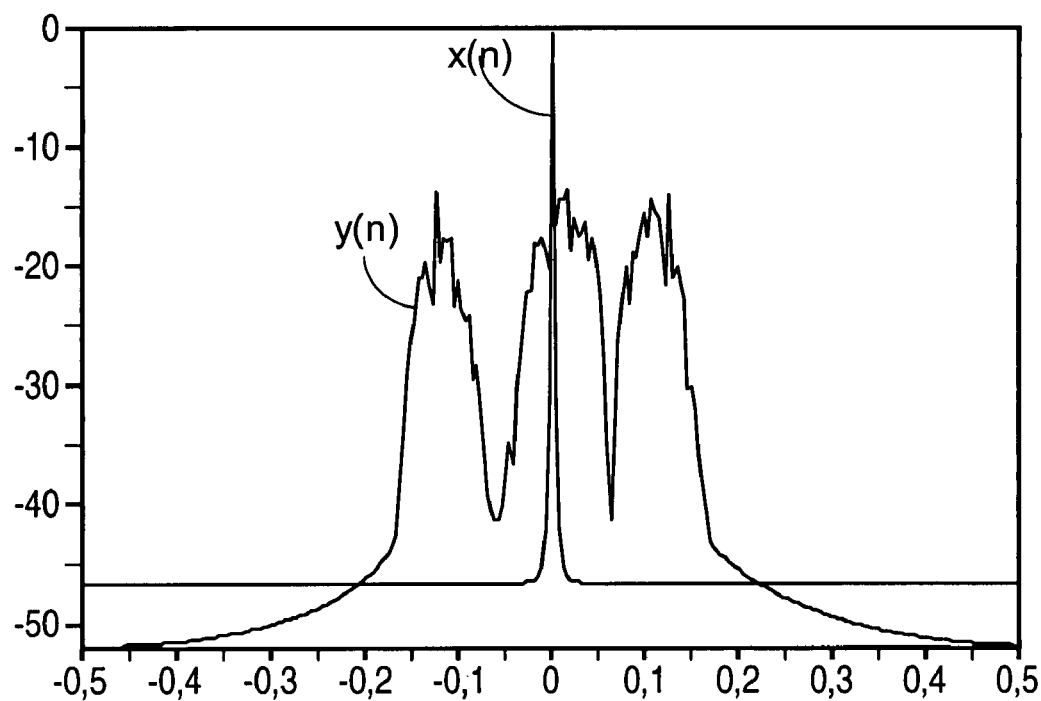
Figure 10:
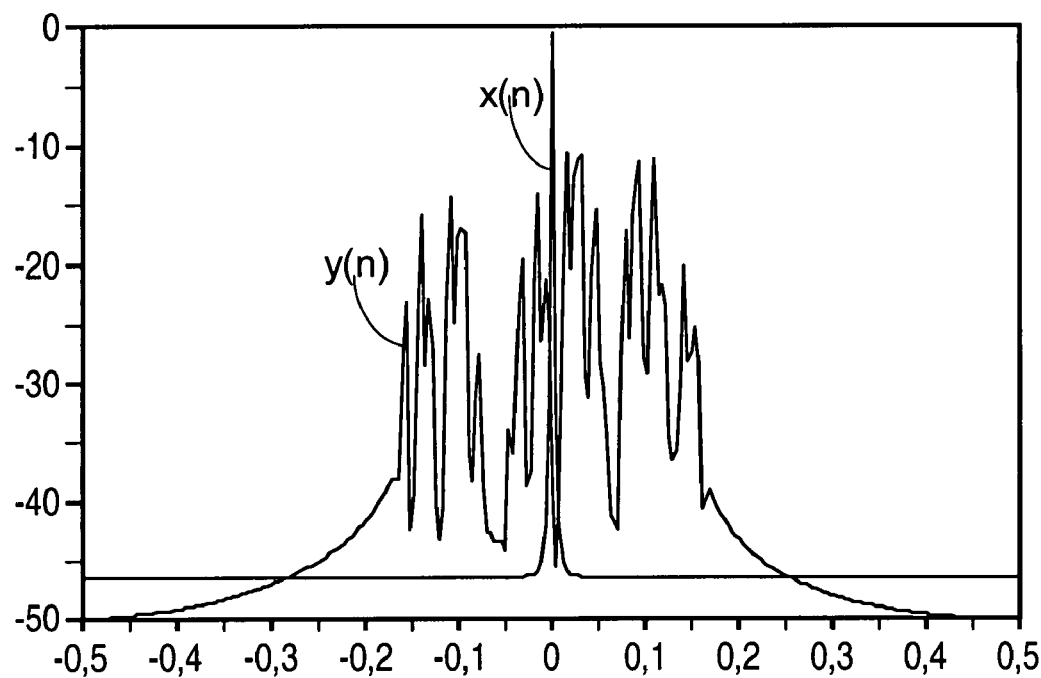

The spectra of FIGS. 8 to 10 are obtained with a large spread (the oversampler 3 has a factor L equal to 128). In these figures, the spectral curves of the output signal y(n) are likewise obtained when the terms $T_p$ of the filter 1 are cancelled in the vicinity of the normalized frequency −0.07 for three, four and nine consecutive values of p, respectively, which corresponds to a degree of freedom D for the choice of the coefficients g(i) of the filter 1, equal to $2^7$, $2^6$ and 2, respectively.

Figure 11:
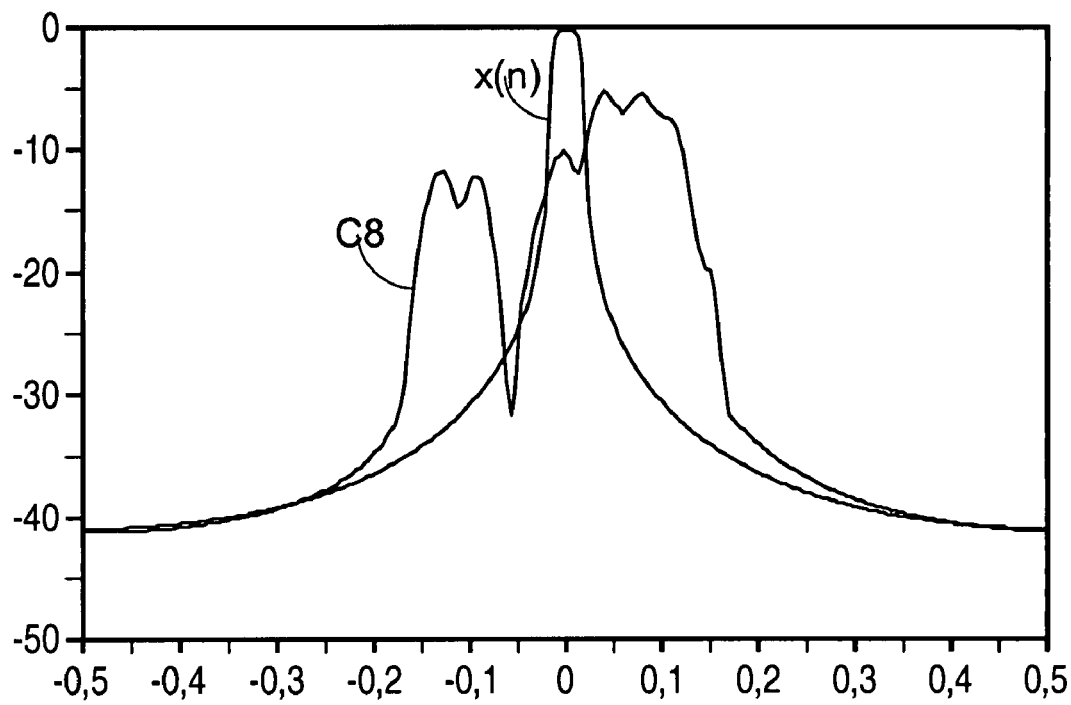
Figure 12:
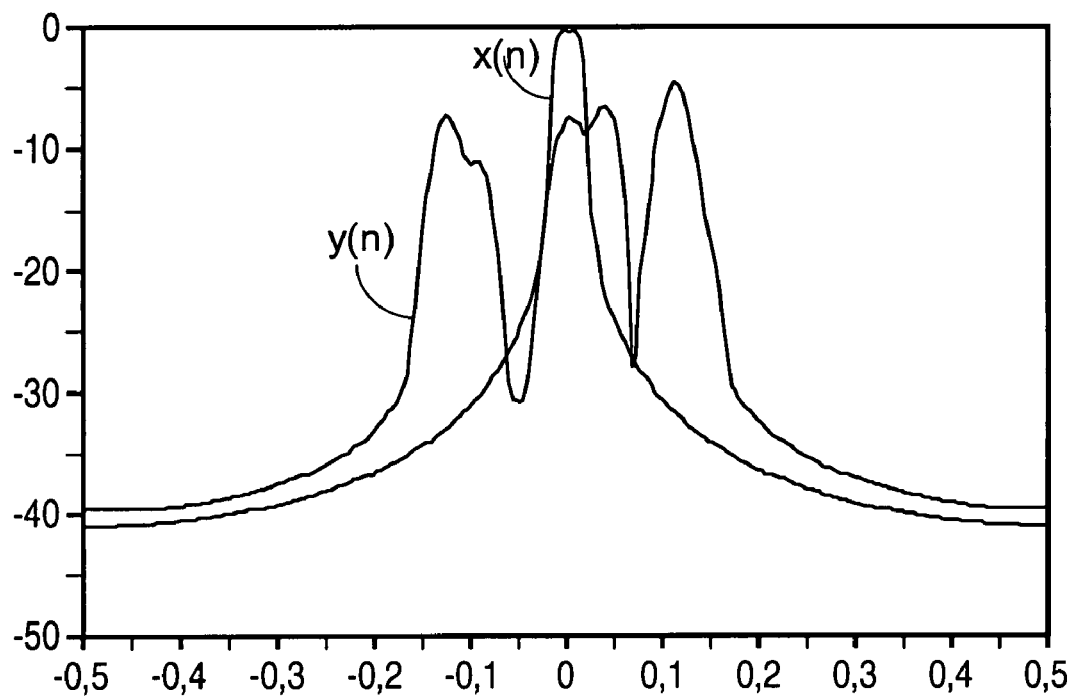
Figure 13:
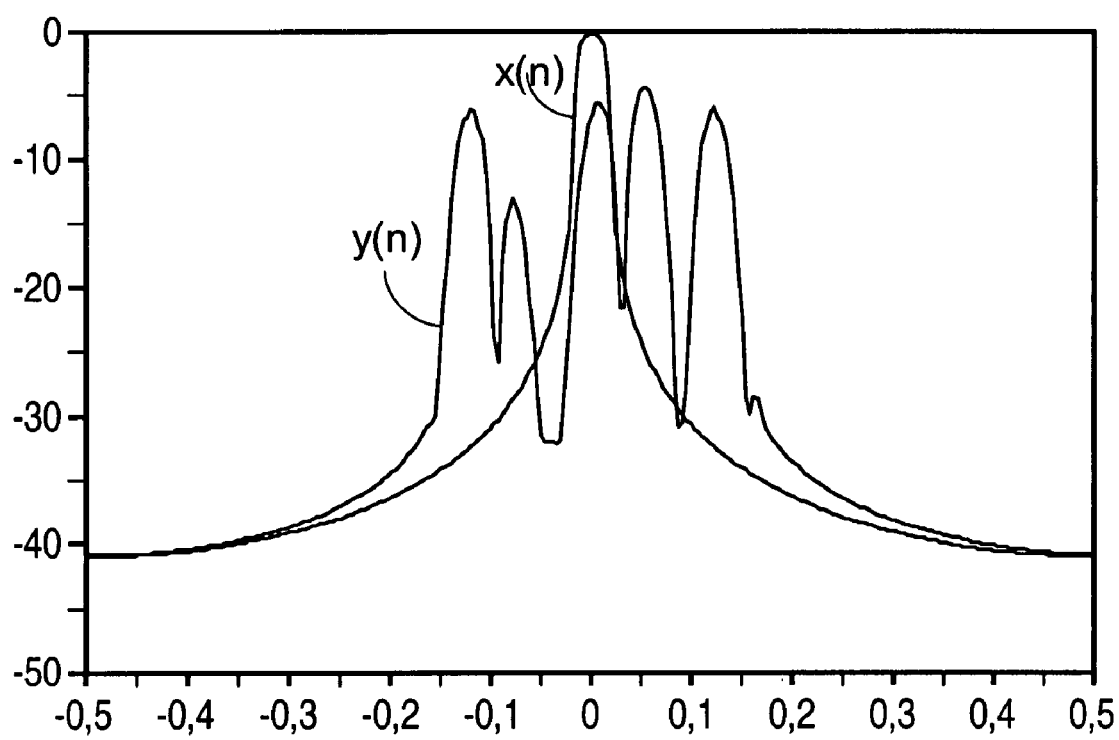

In FIGS. 11 to 13, the spectra are obtained with a linear periodic filter 1 whose period N is equal to $2^7$ and with a slight spread (L=8). In these figures, the spectral curves of the output signals y(n) are likewise obtained when the terms $T_p$ of the filter 1 are cancelled in the vicinity of the normalized frequency −0.07 for three, four and nine consecutive values of p, respectively, which corresponds to a degree of freedom D for the choice of the coefficients g(i) of the filter 1, equal to $2^4$, $2^3$ and 2, respectively.

The invention claimed is:

1. A spread spectrum method for a digital input signal (x(n)), comprising the steps of: choosing coefficients for an invertible digital linear periodic filter such that it spreads a spectrum of the input signal in order to occupy a spread frequency band, with the exception of at least one eliminated frequency sub-band included in the spread frequency band, and processing the input signal with the digital linear periodic filter so as to obtain a spread-spectrum output signal.

2. The method of claim 1, further comprising generating the output of the linear periodic filter so as to preserve the input signal envelope.

3. The method as claimed in claim 1, further comprising providing a digital linear periodic filter having a z-transform in a frequency representation having the following form:

$$Y(z) = \sum_{p=0}^{N-1} T_p \cdot X(zW^p)$$

wherein:

$$T_p = \frac{1}{N} \sum_{k=0}^{N-1} W^{g(k)+pk}$$

$$W = \exp\left(-\frac{2i\pi}{N}\right),$$

N is the filter period, and g(k), for the integers k falling between 0 and N−1 are coefficients to be determined.

4. The method of claim 3, wherein the choice of the coefficients g(k) includes steps consisting in canceling the terms $T_p$ of the filter for all the values of p, such that:

$$\left[-E\left(\frac{f_{max}-b_{min}}{B}N\right)\right]_N \leq p \leq \left[-E\left(\frac{f_{min}-b_{max}}{B}N\right)-1\right]_N,$$

an expression in which [fmin, fmax] represents the frequency band of the digital input signal (x(n)), B represents the spread frequency band, [bmin, bmax] represents the eliminated frequency sub-band (B') included in the frequency band B, E(a) represents the integer part function and $[a]_N$ represents the "modulo N" function.

5. The method of claim 4, wherein the canceling of a term $T_p$ of the linear periodic filter consists in regrouping all the integers falling between 0 and N−1 in pairs $(k_0, k_1)$ such that:

$$W^{g(k_0)+pk_0} + W^{g(k_1)+pk_1} = 0.$$

6. The method as claimed in claim 1, further comprising using a linear periodic filter which is applicable to a constant envelope input signal (x(n)).

7. The method as claimed in claim 1, further comprising pre-oversampling the input signal.

8. The method of claim 7, further comprising prior to being oversampled, processing the input signal by a digital modulator having an M-point constellation.

9. The method as claimed in claim 1, further comprising oversampling the output signal of the linear periodic filter.

10. The method of claim 9, further comprising processing the oversampled output signal by a root raised cosine low-pass filter.

11. The method as claimed in claim 1, further comprises providing a linear periodic filter having a period of the form $2^n$, with n being a positive integer.

* * * * *